US012646323B2

(12) United States Patent
Dehlin

(10) Patent No.: US 12,646,323 B2
(45) Date of Patent: Jun. 2, 2026

(54) MONITORING AND THREE DIMENSIONAL GEOREGISTRATION OF VISUAL MEDIA PUBLISHED ON SOCIAL MEDIA

(71) Applicant: VANTOR SWEDEN AB, Linköping (SE)

(72) Inventor: Jonas Dehlin, Linköping (SE)

(73) Assignee: VANTOR SWEDEN AB, Linköping (SE)

( * ) Notice: Subject to any disclaimer, the term of this patent is extended or adjusted under 35 U.S.C. 154(b) by 330 days.

(21) Appl. No.: 18/314,584

(22) Filed: May 9, 2023

(65) Prior Publication Data

US 2024/0378888 A1       Nov. 14, 2024

(51) Int. Cl.
*G06V 20/40*          (2022.01)
*G06Q 10/40*         (2026.01)
*G06T 17/05*          (2011.01)

(52) U.S. Cl.
CPC ............. *G06V 20/46* (2022.01); *G06Q 10/40* (2026.01); *G06T 17/05* (2013.01)

(58) Field of Classification Search
CPC ........ G06V 20/46; G06Q 50/01; G06T 17/05; G06F 16/587; G06F 16/583
See application file for complete search history.

(56) References Cited

U.S. PATENT DOCUMENTS

| | | |
|---|---|---|
| 8,862,589 B2 | 10/2014 | Harris et al. |
| 10,191,945 B2 | 1/2019 | Rishe |
| 11,122,009 B2 | 9/2021 | Gurevich et al. |
| 2016/0042253 A1* | 2/2016 | Sawhney ............ G06F 18/2323 |
| | | 382/190 |
| 2019/0171668 A1* | 6/2019 | Agrawal ................. G06F 16/00 |
| 2022/0284713 A1* | 9/2022 | Rishi ....................... G06F 18/22 |

OTHER PUBLICATIONS

Karlsson, Justus "GPS-Free UAV Geo-Localization Using a Reference 3D Database" Linköping University, Department of Electrical Engineering Master's thesis, 30 ECTS | Datateknik 2022 | LiTH-ISY-EX-22/5478-SE (44 pages).

* cited by examiner

*Primary Examiner* — John R Wallace

(74) *Attorney, Agent, or Firm* — Harness, Dickey & Pierce, P.L.C.

(57)          ABSTRACT

Monitoring and three dimensional georegistration of visual media published on social media may be provided. First, a search criteria may be received. Then social media flows may be monitored for a combination of video imagery and the search criteria. In response to monitoring the social media flows, the video imagery may be obtained from a social media flow when the social media flow contains the video imagery and the search criteria. A broad matching process may be performed for an area of interest associated with the search criteria. A registration process may be performed for matches of the pairs having ones of the plurality of probability values meeting a predetermined criteria until a matching pair is determined by the registration process.

19 Claims, 3 Drawing Sheets

100

105

110

200

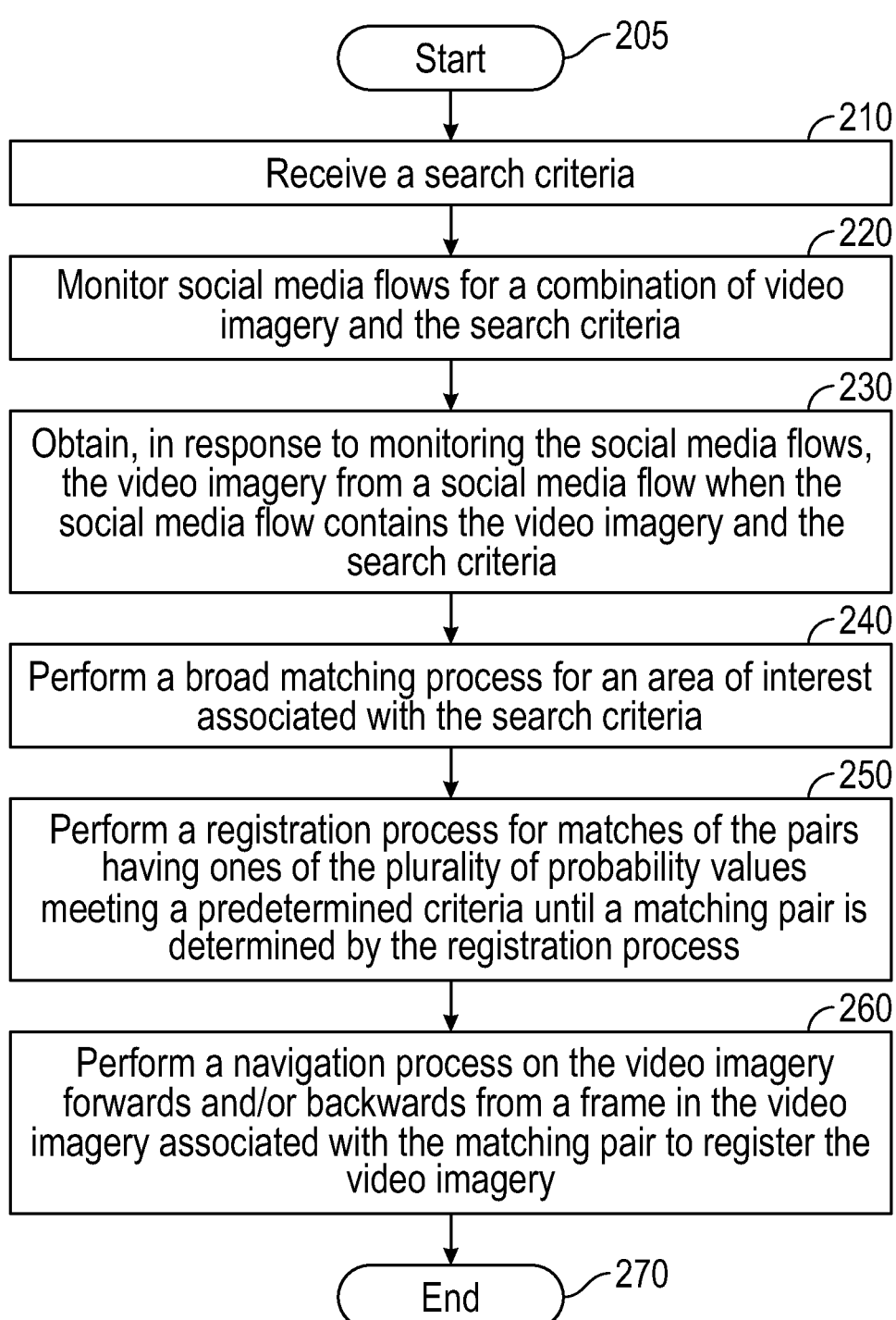

Start —205

↓

210

Receive a search criteria

↓

220

Monitor social media flows for a combination of video imagery and the search criteria

↓

230

Obtain, in response to monitoring the social media flows, the video imagery from a social media flow when the social media flow contains the video imagery and the search criteria

↓

240

Perform a broad matching process for an area of interest associated with the search criteria

↓

250

Perform a registration process for matches of the pairs having ones of the plurality of probability values meeting a predetermined criteria until a matching pair is determined by the registration process

↓

260

Perform a navigation process on the video imagery forwards and/or backwards from a frame in the video imagery associated with the matching pair to register the video imagery

↓

End —270

FIG. 2

MONITORING AND THREE DIMENSIONAL GEOREGISTRATION OF VISUAL MEDIA PUBLISHED ON SOCIAL MEDIA

TECHNICAL FIELD

The present disclosure relates generally to monitoring and three dimensional georegistration of visual media.

BACKGROUND

Social media are interactive technologies that facilitate the creation and sharing of information, ideas, interests, and other forms of expression through virtual communities and networks. While challenges to the definition of social media arise due to the variety of stand-alone and built-in social media services currently available, there are some common features.

The term social suggests that platforms are user-centric and enable communal activity. As such, social media may be viewed as online facilitators or enhancers of human networks, in other words, webs of individuals who enhance social connectivity. Users may access social media services through web-based applications on desktops or download services that offer social media functionality to their mobile devices. As users engage with these electronic services, they create highly interactive platforms to post content online. The posted content may comprise, but is not limited to, video clips with corresponding user comment.

Social media may also be used to read or share news with no real ability to distinguish between the two. It may be up to the user of the platform to find the source reliable or not.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for providing monitoring and three dimensional georegistration of visual media published on social media.

DETAILED DESCRIPTION

Overview

Figure 1:
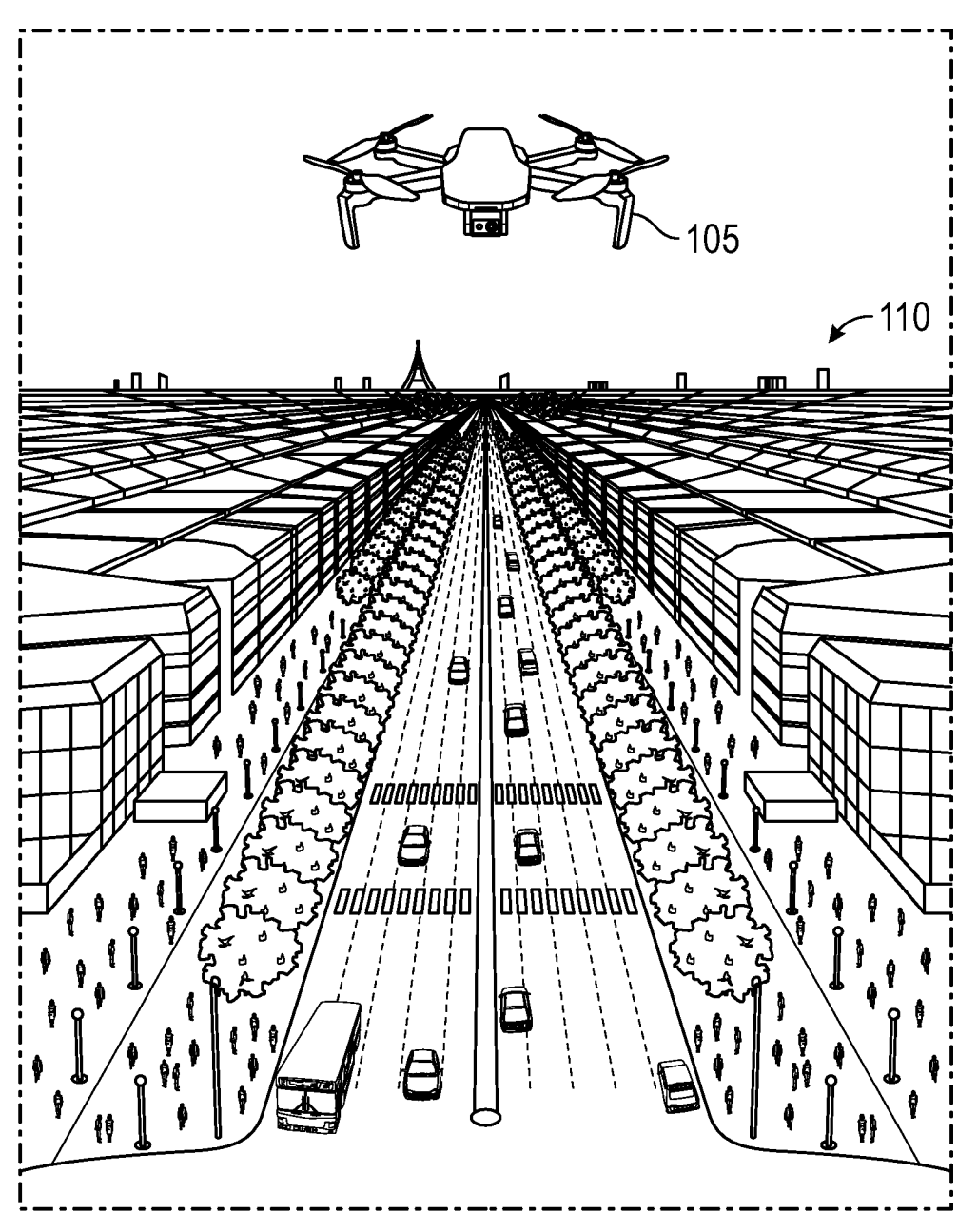
FIG. 1 is a diagram of an operating environment for obtaining video imagery.

Monitoring and three dimensional georegistration of visual media published on social media may be provided. First, a search criteria may be received. Then social media flows may be monitored for a combination of video imagery and the search criteria. In response to monitoring the social media flows, the video imagery may be obtained from a social media flow when the social media flow contains the video imagery and the search criteria. A broad matching process may be performed for an area of interest associated with the search criteria. The broad matching process may comprise: i) partitioning the area of interest into a plurality of cell; and ii) comparing, on a cell-by-cell basis, each of a first plurality of images from the video imagery to a second plurality of images within each of the plurality of cells to determine a plurality of probability values respectively indicating a probability that pairs from each of the first plurality of images and each of the second plurality of images match. A registration process may be performed for matches of the pairs having ones of the plurality of probability values greater that a predetermined criteria until a matching pair is determined by the registration process.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide monitoring and three dimensional georegistration of visual media published on social media. A search criteria may be selected comprising, for example, a place names and/or geographical coordinates. An automated monitoring of social media flows may be performed for combinations of video/images and the search criteria. Then candidate threads may be searched for given place names and coordinates matching the search criteria. Identified videos/images may be downloaded. An automatically content inspection of the video/images may be performed in order to determine if the video/images qualify for further processing. For example, the automatically content inspection may determine if the video/images are suitable for registration.

Next, a broad matching process may be performed for an area of interest using a high-resolution textured three dimensional model as a reference to find candidate starting points for registration using a selection of frames from the video/images. The starting points, for example, may comprise found districts in the area of interest. Then, a registration process may be applied for the highest ranked candidates (e.g., meeting a certain predetermined criteria) to find accurate matches using the high-resolution textured three dimensional model as the reference. The accurate matches may be represented as geographical coordinates. One aim of performing the registration process may be to determine extrinsic and intrinsic sensor parameters for each frame of the video. For example, sensor coordinates, sensor angles, and sensor field-of-view may be solved for. In some embodiments, lens distortion parameters may be modeled as well. A navigation process may then be applied both forwards and/or backwards from the matching frame to register the full video using the high-resolution textured three dimensional model as the reference. Accordingly, the geographical coordinates of a route for a person or vehicle that made the video may be determined.

FIG. 1 is a diagram of an operating environment for obtaining video imagery. As shown in FIG. 1, operating environment 100 may comprise a video imagery collection device 105 and a scene 110. Video imagery collection device

105, may comprise, for example, a drone or a smart phone operated by a user. Video imagery collection device 105 may comprise a commercial Earth observation and imaging satellite used or designed for Earth Observation (EO) from orbit, including environmental monitoring, meteorology, cartography, and others. The satellite may collect images in panchromatic and multispectral bands for example. Notwithstanding, video imagery collection device 105 may comprise any device having a sensor capable of obtaining the video imagery of scene 110.

FIG. 2 is a flow chart setting forth the general stages involved in a method 200 consistent with embodiments of the disclosure for providing monitoring and three dimensional georegistration of visual media published on social media. Method 200 may be implemented using a computing device 300 as described in more detail below with respect to FIG. 3. Ways to implement the stages of method 200 will be described in greater detail below.

Method 200 may begin at starting block 205 and proceed to stage 210 where computing device 300 may receive a search criteria. For example, the search criteria may comprise a name given to an area of interest (e.g., Paris, Malta, the Bosporus, etc.). Furthermore, the search criteria may comprise a tag or handle associated with the area of interest. In other embodiments, the search criteria may comprise geographic coordinates of the area of interest.

From stage 210, where computing device 300 receives the search criteria, method 200 may advance to stage 220 where computing device 300 may monitor social media flows for a combination of video imagery and the search criteria. For example, any one or more feeds from any one or more social media providers may be monitored. A particular flow from a particular social media provider may be flagged if it includes a video imagery and the search criteria in the flow. For example, if the search criteria is "Paris" the flow may be flagged if the word "Paris" is used in the flow and the flow includes video imagery (e.g., a video clip).

With reference to the aforementioned example, video imagery collection device 105 may have been used to take a video clip of scene 110, which may comprise Paris. For example, video imagery collection device 105 may have been a drone taking the video clip from the air or a person using a smart phone to take the video clip from a ground level or from a building at an elevation. This video clip may have then been posted on a social media flow in which the word "Paris" was used in conjunction with the post.

Once computing device 300 monitors the social media flows for the combination of the video imagery and the search criteria in stage 220, method 200 may continue to stage 230 where computing device 300 may obtain, in response to monitoring the social media flows, the video imagery from a social media flow when the social media flow contains the video imagery and the search criteria. For example, once the two conditions are met of containing a video clip and including the search criteria, the video clip may be downloaded. At this point, the video clip may be inspected in order to determine that it qualifies for further processing. Object identification using Artificial Intelligence (AI) or Machine Learning (ML) may be used in this inspection. For example, it may be determined whether it contains material suitable for registration in latter stages. One example for determining that the video clip may not be suitable for further processing may be that the video clip was taken from the ground level and the three dimensional model used as the reference in registration may only work with video clips taken from the air. The aforementioned is an example and other conditions may make the video clip suitable or unsuitable. In other embodiments, the video may be inspected without actively being downloaded first. For example, the video may be assessed by streaming it without downloading it first.

After computing device 300 obtains the video imagery from the social media flow when the social media flow contains the video imagery and the search criteria in stage 230, method 200 may proceed to stage 240 where computing device 300 may perform a broad matching process for an area of interest associated with the search criteria. For example, the broad matching process may include partitioning the area of interest into a plurality of cells. Then the broad matching process may include comparing, on a cell-by-cell basis, each of a first plurality of images from the video imagery to a second plurality of images within each of the plurality of cells to determine a plurality of probability values respectively indicating a probability that pairs from each of the first plurality of images and each of the second plurality of images match.

Referring to the aforementioned example, when the search criteria comprises "Paris", the area of interest may comprise image data of Paris taken from a high-resolution textured three dimensional model. This image data may be partitioned into cells. These cells, for example, may be associated with different districts, sections, or neighborhoods of Paris. Then all the frames or a selection of frames (i.e., the first plurality of frames) from the video imagery may be compared to all the image frames associated with a cell (i.e., the second plurality of frames). Each compared pair may be given a probability of matching. This may be repeated on a cell-by-cell basis until all cells have been processed. Accordingly, this broad matching process may find candidate for starting points for registration.

Consistent with embodiments of the disclosure, data may be obtained from the video imagery and the data may be used to limit the area of interest. For example, a feature unique to a subset of the area of interest may be extracted from the imagery date. For example, a sign saying "St. Germain" may be included in the video imagery. Accordingly, embodiments of the disclosure may limit the area of interest to just the St. Germain district of Paris. Other features unique to a subset of the area of interest may comprise, but are not limited to, street signs, addresses, building names, names of school, names of businesses, geographic coordinates, etc.

From stage 240, where computing device 300 performs the broad matching process for the area of interest associated with the search criteria, method 200 may advance to stage 250 where computing device 300 may perform a registration process for matches of the pairs having ones of the plurality of probability values meeting a predetermined criteria until a matching pair is determined by the registration process. For example, starting with the pair with the highest probability, registration is performed on the pairs until a match is found. Accordingly, one frame in the video imagery may be matched to a frame from one cell in the area of interest (e.g., from the high-resolution textured three dimensional model). The accurate match may be represented as geographical coordinates.

Once computing device 300 performs the registration process for matches of the pairs having ones of the plurality of probability values meeting a predetermined criteria until a matching pair is determined by the registration process in stage 250, method 200 may continue to stage 260 where computing device 300 may perform a navigation process on the video imagery. For example, the navigation process may be performed forwards and/or backwards from a frame in the video imagery associated with the matching pair to register the video imagery. Now that one frame from the video imagery has been registered, embodiments of the disclosure may have a starting point from which to register all the frames in the video imagery. The navigation process may be applied forwards and/or backwards from the matching frame in the video imagery to register full video imagery using the high-resolution textured three dimensional model as a reference. Accordingly, the navigation process may determine the geographical coordinate of the sensor for each frame, as opposed to solving for sensor angles and field-of-view for example.

A route of a sensor used to create the video imagery may be determined based on geographical coordinates (i.e., position) of the sensor and parameters of the sensor produced by the navigation process. The parameters may comprise the look angel of the sensor (e.g., yaw, pitch, roll) and the zoom level of the sensor (e.g., characterized by the horizontal and vertical field of view). Once computing device 300 perform the navigation process on the video imagery both forwards and backwards from the frame in the video imagery associated with the matching pair to register the video imagery in stage 260, method 200 may then end at stage 270.

Figure 3:
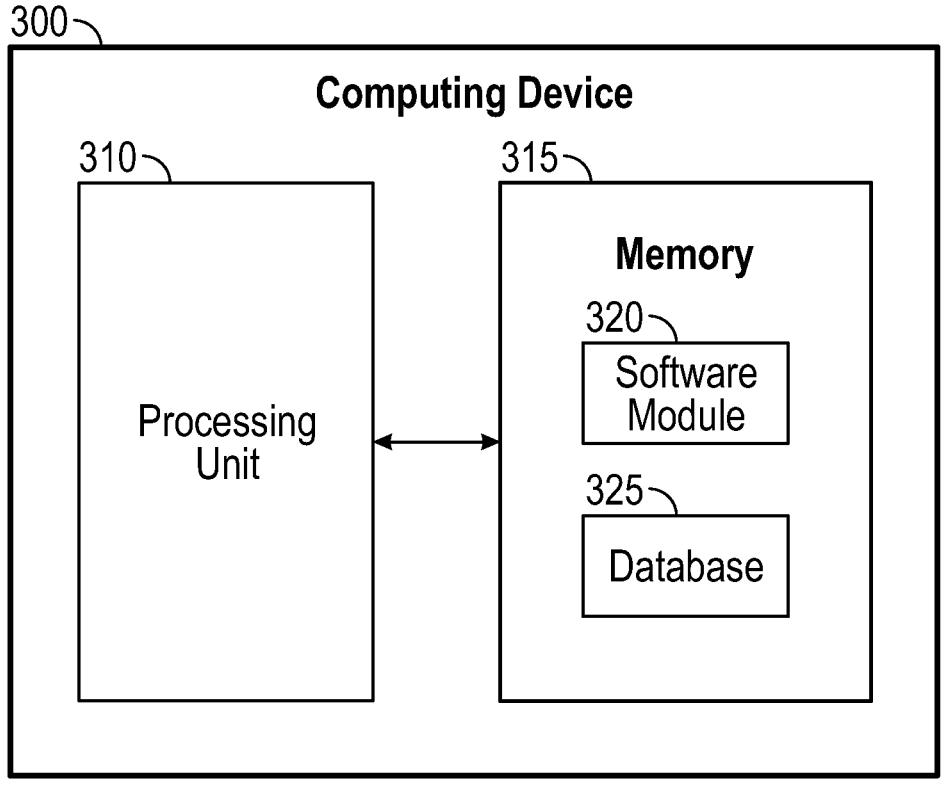
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing monitoring and three dimensional georegistration of visual media published on social media as described above with respect to FIG. 2. Notwithstanding, computing device 300 may be deployed anywhere and the image data may be transmitted from to a network, for example, and then sent to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 3 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a search criteria;
   monitoring social media flows for a combination of video imagery and the search criteria;
   obtaining, in response to monitoring the social media flows, the video imagery from a social media flow when the social media flow contains the video imagery and the search criteria;
   comparing each of a first plurality of images from the video imagery to a second plurality of images for an area of interest associated with the search criteria, whereby each combination of one of the first plurality of images and one of the second plurality of images defines a pair;
   based on the comparison, determining, for each of the pairs, a probability value indicating a probability that the one of the first plurality of images and the one of the second plurality of images of said pair matches; and
   performing a registration process for the pairs, for which the probability values meet a predetermined criteria, until a matching pair, based on geographic coordinates, is determined by the registration process.

2. The method of claim 1, further comprising partitioning the area of interest into a plurality of cells; and
   wherein comparing each of the first plurality of images to the second plurality of images is on a cell-by-cell basis.

3. The method of claim 1, further comprising performing a navigation process on the video imagery both forwards and backwards from a frame in the video imagery associated with the matching pair to register the video imagery.

4. The method of claim 3, further comprising determining a route of a sensor used to create the video imagery based on geographical coordinates produced by the navigation process and parameters of the sensor.

5. The method of claim 3, wherein performing the navigation process comprises using a high-resolution textured three dimensional model.

6. The method of claim 1, further comprising, prior to comparing each of the first plurality of images to the second plurality of images determining that a high-resolution textured three dimensional model may be used in conjunction with the video imagery.

7. The method of claim 1, wherein the search criteria comprises a name of a place.

8. The method of claim 1, wherein the search criteria comprises geographical coordinates.

9. The method of claim 1, further comprising:
   obtaining data from the video imagery; and
   using the data to limit the area of interest.

10. The method of claim 1, wherein the first plurality of images from the video imagery comprise all images from the video imagery.

11. The method of claim 1, wherein performing the registration process comprises using a high-resolution textured three dimensional model as a reference.

12. The method of claim 1, further comprising using a high-resolution textured three dimensional model to obtain the second plurality of images.

13. A system comprising:
   a memory storage; and
   a processing unit coupled to the memory storage, wherein the processing unit is operative to:
      receive a search criteria;
      monitor social media flows for a combination of video imagery and the search criteria;
      obtain, in response to monitoring the social media flows, the video imagery from a social media flow when the social media flow contains the video imagery and the search criteria;
      compare each of a first plurality of images from the video imagery to a second plurality of images for an area of interest associated with the search criteria, whereby each combination of one of the first plurality of images and one of the second plurality of images defines a pair;
      based on the comparison, determine, for each of the pairs, a probability value indicating a probability that the one of the first plurality of images and the one of the second plurality of images of said pair matches; and
      perform a registration process for the pairs, for which the probability values meet a predetermined criteria, until a matching pair, based on geographic coordinates, is determined by the registration process.

14. The system of claim 13, wherein the processing unit is further operative to partition the area of interest into a plurality of cells; and
   wherein the processing unit is operative to compare each of the first plurality of images to the second plurality of images on a cell-by-cell basis.

15. The system of claim 13, wherein the processing unit is further operative to perform a navigation process on the video imagery both forwards and backwards from a frame in the video imagery associated with the matching pair to register the video imagery.

16. The system of claim 15, wherein the processing unit is further operative to determine a route of a sensor used to create the video imagery based on geographical coordinates produced by the navigation process and parameters of the sensor.

17. The system of claim 13, wherein the processing unit is further operative to, prior to comparing each of the first plurality of images to the second plurality of images, determine that a high-resolution textured three dimensional model may be used in conjunction with the video imagery.

18. The system of claim 13, wherein the search criteria comprises one of a name of a place and geographical coordinates.

19. A non-transitory computer-readable medium that stores a set of instructions which when executed perform a method executed by the set of instructions comprising:
   receiving a search criteria;
   monitoring social media flows for a combination of video imagery and the search criteria;
   obtaining, in response to monitoring the social media flows, the video imagery from a social media flow when the social media flow contains the video imagery and the search criteria;
   partitioning an area of interest into a plurality of cells;

comparing, on a cell-by-cell basis, each of a first plurality of images from the video imagery to a second plurality of images for the area of interest associated with the search criteria, whereby each combination of one of the first plurality of images and one of the second plurality of images defines a pair;

based on the comparison, determining, for each of the pairs, a probability value indicating a probability that the one of the first plurality of images and the one of the second plurality of images of said pair matches; and performing a registration process for the pairs, for which the probability values meet a predetermined criteria, until a matching pair, based on geographic coordinates, is determined by the registration process.

* * * * *